United States Patent
Shah (10) Patent No.: US 9,987,939 B2
(45) Date of Patent: Jun. 5, 2018

(54) METHOD OF DOCKING AN ELECTRIC VEHICLE FOR CHARGING

(71) Applicant: Proterra Inc., Greenville, SC (US)

(72) Inventor: Keyur M. Shah, Erie, PA (US)

(73) Assignee: Proterra Inc., Burlingame, CA (US)

( * ) Notice: Subject to any disclaimer, the term of this patent is extended or adjusted under 35 U.S.C. 154(b) by 0 days. days.

(21) Appl. No.: 15/231,992

(22) Filed: Aug. 9, 2016

(65) Prior Publication Data
US 2018/0043787 A1  Feb. 15, 2018

(51) Int. Cl.
*H02J 7/00* (2006.01)
*B60L 11/18* (2006.01)

(52) U.S. Cl.
CPC ....... *B60L 11/1827* (2013.01); *B60L 11/1818* (2013.01); *B60L 11/1838* (2013.01); *H02J 7/0026* (2013.01); *B60L 2200/18* (2013.01); *B60L 2230/12* (2013.01)

(58) Field of Classification Search
USPC .......................................... 320/109
See application file for complete search history.

(56) References Cited

U.S. PATENT DOCUMENTS

| 9,352,658 B2 | 5/2016 | Morris |
| 2013/0193918 A1* | 8/2013 | Sarkar .................. B60L 3/04 320/109 |

* cited by examiner

*Primary Examiner* — Robert Grant
(74) *Attorney, Agent, or Firm* — Bookoff McAndrews, PLLC (57) ABSTRACT

A method of docking an electric vehicle with a charging station includes periodically transmitting data from the vehicle to the charging station. The transmitted data may include a distance travelled by the vehicle location towards the charging station and its speed. An incremental distance travelled by the vehicle in a time interval between when the data is collected and received is calculated, and the distance corrected based on this calculated value. The relative position of the vehicle with respect to the charging station is determined based on the corrected distance, and a charge head of the charging station is automatically connected with the charging interface of the vehicle based on the determined relative position.

20 Claims, 4 Drawing Sheets

METHOD OF DOCKING AN ELECTRIC VEHICLE FOR CHARGING

TECHNICAL FIELD

The current disclosure relates to systems and methods for docking an electric vehicle for charging.

BACKGROUND

Electric vehicles, such as buses, are charged at external charging stations. The process of electrically connecting the vehicle to the charging station is called docking. The docking method for an electrical vehicle depends upon the configuration of the charging connection (called charging interface) on the vehicle and the mating connection on the charging station. In some electric buses, when the bus is positioned below an overhanging charge head of a charging station, the charge head descends to engage with a charging interface on the roof of the bus. For proper engagement of the charge head with the charging interface, the bus should be correctly positioned at the charge head. If the positioning of the bus (with respect to the charging assembly) is not suitable for docking, the docking process may be abandoned. The bus may then have to be repositioned before docking is attempted. In some cases, docking of the bus with the charging station may take several minutes and/or several attempts. For efficient operation of the bus, docking of the bus should be quick and independent of operator experience.

Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to systems and methods for docking of an electric vehicle with a charging station. Each of the embodiments disclosed herein may include one or more of the features described in connection with any of the other disclosed embodiments.

In one embodiment, a method of docking an electric vehicle with a charging station is disclosed. The method includes collecting data at the electric vehicle and periodically transmitting information from the electric vehicle to the charging station as the electric vehicle travels from a first location towards the charging station. The transmitted information may be derived at least partly from the collected data and include a distance (d) travelled by the electric vehicle from the first location towards the charging station, and a speed (v) of the electric vehicle. The method may also include receiving the transmitted information at the charging station, and computing an incremental distance ($\Delta d$) travelled by the electric vehicle in a time interval ($\Delta t$) between when the data is collected at the electric vehicle and when the transmitted information is received at the charging station. The method may also include calculating a corrected distance (d') based on the computed incremental distance ($\Delta d$) and the received distance (d), and determining a relative position of the electric vehicle with respect to the charging station based on at least the calculated corrected distance (d'). The method may further include automatically connecting a charge head of the charging station with a charging interface of the electric vehicle based on the determined relative position.

In another embodiment, a method of docking an electric vehicle at a charging station is disclosed. The method may include identifying the electric vehicle at a first location as the electric vehicle approaches the charging station. The identifying may include determining whether the electrical vehicle is supposed to be charged at the charging station. The method may also include periodically transmitting data packets from the electric vehicle to the charging station. The periodically transmitting may include transmitting successive data packets at a time interval ($\Delta t$). The transmitted data packets may include a distance (d) travelled by the electric vehicle from the first location towards the charging station, and a speed (v) of the electric vehicle. The method may also include computing an incremental distance ($\Delta d$) travelled by the electric vehicle in the time interval ($\Delta t$), and calculating a corrected distance (d') as a sum of the computed incremental distance ($\Delta d$) and the received distance (d). The method may further include automatically moving a charge head of the charging station to contact a charging interface of the electric vehicle when the calculated corrected distance (d') reaches a predetermined value.

In yet another embodiment, a method of docking an electric vehicle at a charging station is disclosed. The charging station may include a charge head configured to make electrical contact with a charging interface positioned on a roof of the vehicle. The method may include identifying the electric vehicle at a first location as the electric vehicle approaches the charging station, and periodically transmitting data packets from the electric vehicle to the charging station. The periodically transmitting may include transmitting successive data packets at a time interval ($\Delta t$). The transmitted data packets may include a distance (d) travelled by the electric vehicle from the first location towards the charging station, and a speed (v) of the electric vehicle. The method may also include computing an incremental distance ($\Delta d$) travelled by the electric vehicle in the time interval ($\Delta t$), and calculating a corrected distance (d') based on the computed incremental distance ($\Delta d$). The method may additionally include detecting structural features on the electric vehicle using one or more sensors located in the charging station, and checking an accuracy of the calculated corrected distance (d') based on the detected structural features. If the checking indicates that the calculated correct distance (d') is accurate, the method may further include automatically lowering the charge head to contact the charging interface of the electric vehicle when the calculated corrected distance (d') reaches a predetermined value.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for controlling the docking of an electric vehicle with a charging station. While principles of the current disclosure are described with reference to the docking of an electric bus with a charging station, it should be understood that the disclosure is not limited thereto. Rather, the systems and methods of the present disclosure may be used to control the docking of any vehicle (motorcycle, trains, cars, plane, etc.).

Figure 1:
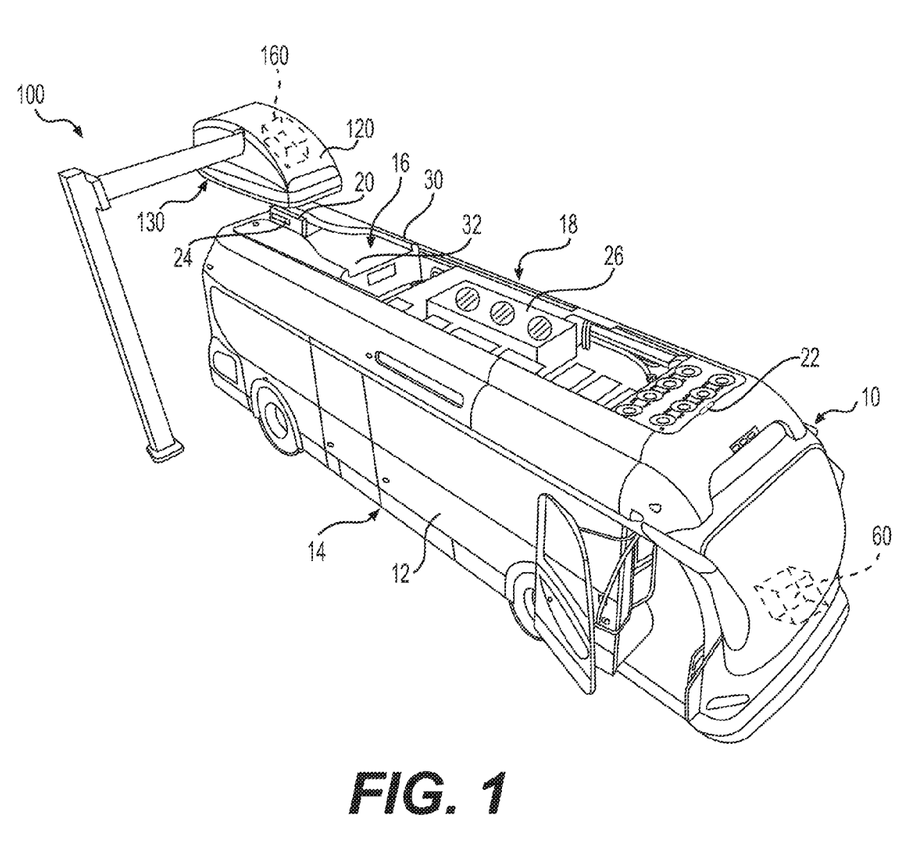
FIG. 1 is an exemplary electric bus of the current disclosure.

FIG. 1 illustrates an electric vehicle in the form of an electric transit bus 10. Electric bus 10 may include a body 12 enclosing a space for passengers. In general, body 12 may have any size, shape, and configuration, and may be made of any material (metal, composite, etc.). In some embodiments, bus 10 may be a low-floor electric bus. As is known in the art, in a low-floor bus, there are no steps at the front and/or the back doors of the bus. In such a bus, the floor of the bus 10 is positioned close to the road surface (e.g., about 12-16 inches) to ease passenger exit and entry. In this disclosure, relative terms such as "about," "substantially," "approximately," etc. are used to indicate a possible variation of ±10% in a stated value. Bus 10 may be propelled by an electric motor (not shown). A battery system 14 may store electrical energy to power the motor. The batteries that comprise the battery system 14 may have any chemistry (lithium titanate oxide (LTO), nickel manganese cobalt (NMC), etc.) and construction. In some embodiments, the battery system 14 may enable fast charging. By fast charging, the battery system 14 may be recharged (to greater than about 95% state of charge) in less than or equal to about 10 minutes. In some embodiments, the bus 10 may be charged more slowly.

A charging interface 16 may be provided on the roof 18 of the bus 10 (or elsewhere) to charge the battery system 14. The charging interface 16 may include components that interface with a charge head 130 of an external charging station 100 to charge the battery system 14. These components may include a charging blade 20 and a funnel-shaped alignment scoop 30. The charging blade 20 may support electrodes 24 (one electrode is shown in FIG. 1) that are electrically connected to the battery system 14. During docking, when the bus 10 is positioned under an overhanging charging assembly 120 of the charging station 100, the charge head 130 may descend from the charging assembly 120, and land on the roof 18 (e.g., on a landing zone 32 of the charging interface 16). With the charge head 130 resting on the roof 18, the bus 10 is moved until electrical contact is made between the electrodes (not shown) of the charge head 130 and the electrodes 24 of the charging blade 20. Current flow (i.e., charging) into the bus 10 may be initiated after electrical contact is made between the electrodes.

As the bus 10 moves forward with the charge head 130 resting on its roof 18, the rails of the funnel-shaped alignment scoop 30 arranged on either side of the blade 20, may push and direct the charge head 130 into alignment with the charging blade 20. The funnel shape of the alignment scoop 30 (and the play in the charge head 130) enables the charging system to tolerate some amount of lateral misalignment between the charge head 130 and the charging blade 20 during docking. U.S. Pat. No. 9,352,658, U.S. Patent Publication No. 2013/0193918, and U.S. patent application Ser. No. 14/980,697, commonly-assigned to the assignee of the current application, describe embodiments of the charging interface 16, charge head 130, and their engagement process. These references are incorporated by reference in their entirety herein. Although not described herein, bus 10 may also include a charging socket (not shown) configured to receive a plug to charge the batteries when parked in a bus depot at night.

Bus 10 may include a control unit 60 and the charging station 100 may include a control system 160 that are configured to control, among other things, the docking and charging operations of the bus 10. Control unit 60 may be an integrated master control system that controls several operations of the bus 10. In some embodiments, control unit 60 may be a distributed control system. That is, the functions of control unit 60 may be divided between several different controllers (e.g., transmission controller, vehicle controller, wireless controller, etc.) of the bus 10. Similarly, control system 160 of charging station 100 may also be an integrated master control system or a distributed control system housed at the same or different locations (the structure of the charging station 100 or elsewhere).

Bus 10 may be a transit bus or an extended range bus. A transit bus operates on a fixed schedule and a fixed route in a geographic area (city, town, airport, campus, etc.), picking up and dropping off passengers at several bus stops along the route. An extended range bus may typically travel between two locations (cities, towns, etc.), and may be charged at the origin and/or at the destination. One or more charging stations 100 may be located at bus stops (or elsewhere on the route) to charge the buses 10. The charging assembly 120 of each charging station 100 may overhang a surface (e.g., road) that the bus 10 travels on. The charging station 100 may be coupled to an electric grid that is supplied with electrical energy by a utility company. Single phase or three-phase AC current from the electrical grid may be converted into DC current and directed into the charging assembly 120. The charging station 100 may include electrical components (e.g., rectifier, power converter, switches, safety mechanisms, etc.) to convert the AC current from grid to DC current for the charging assembly 120. In some embodiments, a bus 10 may dock with the charging station 100 and charge while passengers enter and exit the bus 10.

Figure 2A:
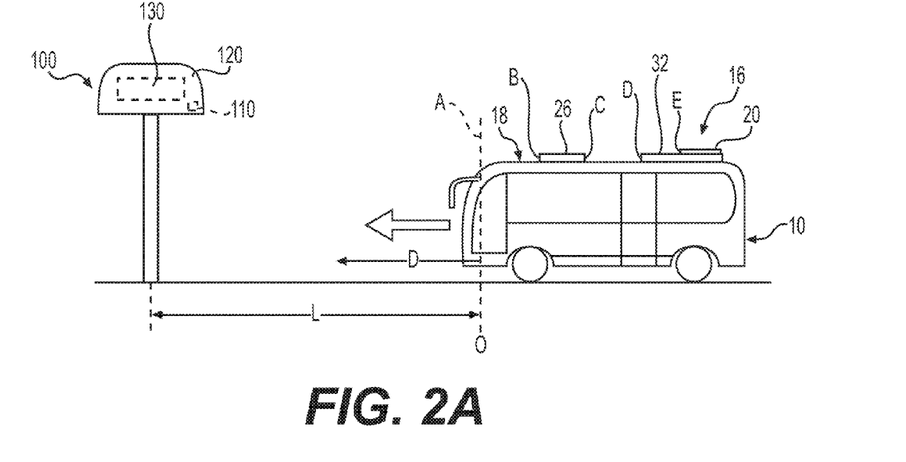
FIG. 2A is a schematic illustration of the bus of FIG. 1 approaching a charging station for docking.
Figure 2B:
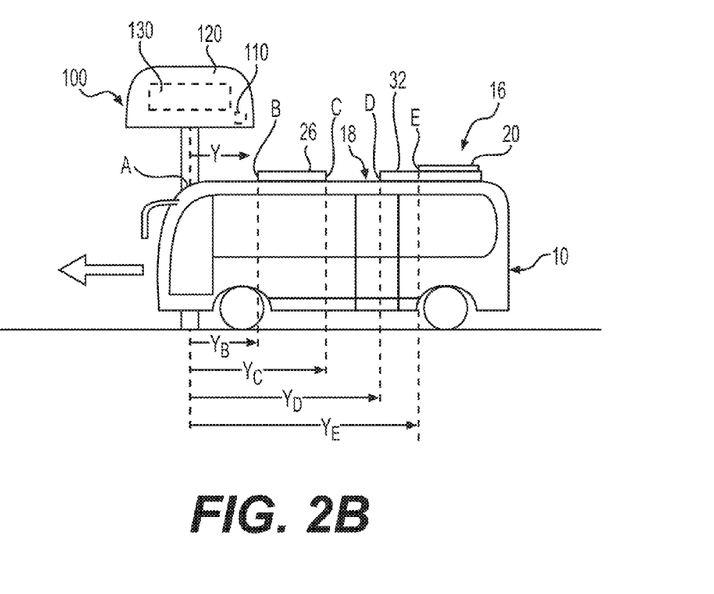
FIG. 2B is a schematic illustration of the bus of FIG. 1 positioned below a charging station for docking.

FIGS. 2A and 2B are schematic illustrations used to describe an exemplary docking process of the bus 10 at the charging station 100. With reference to FIG. 2A, when the bus 10 approaches the charging station 100 (in the direction of the illustrated arrow), a low-level communication link (wireless connection) may first be established between the control unit 60 (of the bus 10) and the control system 160 (of the charging station 100). Due to this low-level communication link, the charging station 100 may be aware of the presence of the bus 10 but may not be configured to begin one-on-one communication with the bus 10. In some embodiments, using the low-level communication link, the bus 10 may receive messages broadcast from the charging station 100. Depending on the bus speed, the low-level communication link may be established when the bus is about 100-200 feet away from the charging station 100.

After the low-level communication link is established, the driver of the bus 10 may slow the bus 10 such that its speed (v) is less than or equal to about 15 MPH (i.e., $0 < v \leq 15$ MPH), and approach the charging station 100 at this speed. In some embodiments, the approach speed (v) may be controlled (e.g., limited, etc.) by the charging station 100. As the bus 10 continues to approach the charging station 100, the control system 160 of the charging station 100 may identify the approaching bus 10. In general, the bus 10 may be identified by any known method (communication with the driver, etc.). In some embodiments, the bus 10 may be automatically identified. For example, an RFID (radio-frequency identification) reader in the charging station 100 may read the bus-identification information (ID) programmed into an RFID tag 22 in the bus (see FIG. 1). In general, depending on the bus speed and environmental conditions, the RFID reader may read the ID when the bus 10 is between about 10-40 feet from the charging station 100. In some embodiments, the RFID reader may be configured to read the tag 22 when the bus 10 is about 30 feet from the charging station 100. The distance at which the RFID reader reads the tag 22 is indicated in FIG. 2 as "L." A high-level wireless communication link (which enables one-one communication) may be established between the bus 10 and the charging station 100 and the automatic docking process begins. In some embodiments, before the docking process begins, the charging station 100 confirms that the bus 10 is configured to, and/or wants to, charge at the charging station 100. In some embodiments, this confirmation may be made by broadcasting the detected bus ID to the approaching bus 10. Upon receipt of this broadcast message, the bus 10 may confirm its ID (the driver may respond or the control unit 60 may automatically respond) and indicate whether charging is desired. In such embodiments, distance "L" in FIG. 2A indicates the location where confirmation is received. In some embodiments, the bus ID may indicate to the charging station 100 the particulars (e.g., structures located on the roof of the bus, their height and/or other dimensions, etc.) of the bus 10.

Based on the bus ID, the control system 160 (of the charging station 100) may confirm that the approaching bus 10 is a bus that is configured to be charged at the charging station 100 (and not a different type of bus). In some embodiments, the control system 160 may also use the ID to configure the charging station 100 to service the approaching bus 10. For example, based on the bus height associated with the ID, the control system 160 may determine the distance (the total descend distance and/or the pre-deployment height described later) by which the charge head 130 of the charging assembly 120 descends to land on the roof 18 of the approaching bus 10. If the ID is not read, or if the ID indicates that the bus 10 is not supposed to be charged at the charging station 100, the charge head 130 is not lowered, and the bus 10 is allowed to proceed.

After the bus 10 is conclusively identified as a bus that is configured to be charged at the charging station 100 (which happens when the bus 10 is at about a distance L from the charging station 100), the bus 10 and the charging station 100 may exchange information. The charging station 100 may send instructions to the bus 10 to reset a counter that records motor rotations (described below), and the bus 10 may transmit data to the charging station 100. At least some of the data transmitted by the bus 10 to the charging station 100 may be derived from data collected by sensors in the bus 10. The transmitted data may include the speed (v) of the bus 10 and the distance (d) moved by the bus 10 towards the charging station 100. The counter records the number of rotations made by the traction motor of the bus as the bus 10 moves towards the charging station 100. After the counter is reset by the charging station 100, the counter records the number of rotations the shaft of the traction motor makes from point "0" marked in FIG. 2A. The rotations of the motor shaft may be detected by an optical encoder or another sensor associated with the motor. Based on the counter reading, and fixed dimensional parameters of the bus (e.g., axle ratio, diameter of the wheels, etc.), the control unit 60 of the bus 10 may then compute the linear distance (d) moved by the bus 10 towards the charging station 100. The determined distance (d) and the speed (v) of the bus 10 is then transmitted as a data packet by the control unit 60 (of the bus 10) to the control system 160 (of the charging station 100). That is, after the counter is reset (when the bus is at a distance L from the charging station 100), the bus 10 transmits the distance (d) moved by the bus 10 towards the charging station 100 and its speed (v), to the charging station 100. In some embodiments, the data packet transmitted by the bus 10 may also include information such as, ignition switch position, parking brake position, gear position, length, etc.

In addition to transmitting the data packets to the control system 160, the control unit 60 performs several other functions related to bus operation. The algorithm included in the control unit 60 operates in a loop and transmits successive data packets to the control system 160 in a periodic manner. The time interval ($\Delta t$) between two successive data transmissions (called loop time) depends upon the hardware and software included in the control unit 60. As explained previously, although control unit 60 is described as a single unit, control unit 60 may in fact comprise several individual controllers (e.g., transmission controller, vehicle controller, wireless controller, etc.) that operate together. For example, the transmission controller may receive motor rotation data from the optical encoder coupled to the motor shaft, compute the corresponding linear distance (d), and transmit this result to the vehicle controller. The vehicle controller may determine the vehicle speed (v) at that time and create a data packet with distance (d) and speed (v) information. This data packet may then be transferred to the wireless controller which transmits the data packet to the charging station 100. The time interval ($\Delta t$) between two successive data packets may be the sum of the loop times of each of these controllers.

In some embodiments, the time interval ($\Delta t$) (or time delay) between two successive data packets may vary from about 500 millisecond (ms) to 1 second. That is, the control system 160 of the charging station 100 may receive a data packet containing data from the time when bus 10 was located at point 0, about 0.5-1 seconds after the bus crosses point 0. In other words, ($\Delta t$) is the time delay between when the data is collected and when that same data is received at the charging station. If the bus 10 is travelling at 5 MPH (7.33 feet/second) towards the charging station 100, the bus 10 may travel about 3.7-7.3 feet from point 0 (towards the charging station 100) before the speed (v) and distance (d) recorded by the bus 10 at point 0 is received by the charging station 100. That is, the bus may travel a certain distance (incremental distance ($\Delta d$)) between the time when a data set is collected and the time when the same data set is received at the charging station. Because of this time lag, the charging station 100 may not be able to correctly determine the position of the bus 10 under the charging station 100. This error in accurately determining the position of the bus 10 may cause errors during docking (or docking errors). For example, the charge head 130 of the charging station 100 may not descend at the correct time to land on the landing zone 32 (see FIG. 1), requiring the bus 10 to abort the docking process. Increasing the bus approach speed (v) during docking may exacerbate the error in position determination. However, increasing speed (v) may improve operational efficiency of the bus by decreasing docking time.

To reduce such docking errors, the control system 160 of the charging station 100 may correct the distance (d) received from the bus 10 based on the received speed (v). Knowing the expected time interval ($\Delta t$) between data packets, the control system 160 may compute the incremental distance ($\Delta d$) travelled by the bus during time interval ($\Delta t$), and correct the value of the distance (d) received from the bus 10. For example, if a data packet ($d_i$, $v_i$) is received by the control system 160 at a time $t_i$, the control system 160 may determine the incremental distance ($\Delta d_i$) travelled by bus 10 during time interval ($\Delta t$) as (($v_i$)×($\Delta t$)). That is, ($\Delta d_i$)=(($v_i$)×($\Delta t$)). The control unit 160 may then algebraically add the computed incremental distance ($\Delta d$) to the received distance ($d_i$) to get a corrected distance ($d_i'$). That is, ($d_i'$)=($d_i$+$\Delta d_i$). That is, in general, upon receipt of a data packet, the control system 160 corrects the value of the received distance (d) based on the value of the received speed (v) to get a corrected distance (d'). It should be noted that, instead of assuming that the time interval ($\Delta t$) is a fixed value, the control system 160 may also determine the time interval upon receipt of a data packet. For example, the control system 160 may approximate ($\Delta t$) as the difference in time between when the current data packet was received and the time when the prior data packet was received (i.e., $\Delta t_i = t_i - t_{i-1}$).

It should be noted that calculating the incremental distance ($\Delta d$) travelled by bus as (v×$\Delta t$), assumes that the speed (v) of the bus remains a constant during time interval $\Delta t$. Because of the inertia of the bus 10 (which causes any change in speed to be slow) and the relatively small time interval ($\Delta t$), this is a reasonable assumption. However, this is not a limitation. In some embodiments, if the speed of the bus between the prior data packet (i.e., $v_{i-1}$) and the current data packet (i.e., $v_i$) changes beyond a predetermined threshold value (i.e., $|(v_{i-1}-v_i)| \geq$ a predetermined value), the control system 160 may account for this error in its calculation. For example, the control system 160 may determine the incremental distance $\Delta d$ as (($v_i$×$\Delta t$)+($\frac{1}{2}(v_{i-1}-v_i)$×$\Delta t$)), where ($\frac{1}{2}(v_{i-1}-v_i)$×$\Delta t$) accounts for the changing velocity. Knowing length L, the corrected distance (d') travelled by the bus 10, and dimensional details of the bus 10 (e.g., position of different components on the roof 18), the control system 160 may determine when different structural features (e.g., marked A, B, C, D, and E in FIG. 2A) on the roof 18 are positioned under the charging assembly 120, and lower the charge head 130 such that it correctly lands on the landing zone 32 of the charging interface 16 (see FIG. 1).

In some embodiments, the charging assembly 120 may include one or more sensors (e.g., an ultrasonic sensor 110) configured to identify different structural features (e.g., HVAC unit 26, charging interface 16, etc.) on the roof 18 of the bus 10. The control system 160 may use these detected features to confirm that the calculated corrected distance (d') (calculated based on data transmitted by the bus 10) is indeed correct. For example, with reference to FIG. 2A, when the corrected distance (d') reaches L, the control system 160 may expect feature A (positioned proximate the front of the bus 10) to be positioned under the charging assembly 120. If feature A is detected by the sensors of the charging station within a predetermined range of this distance (e.g., when d'=L±0.2L, etc.), then the control system 160 confirms that the bus 10 is entering the area under the charging assembly 120. In some embodiments, if the error in the predicted (i.e. corrected distance (d')) and actual positions of feature A is above a first threshold value, the predicted position may be corrected based on the actual position. In some embodiments, if the expected feature A is not detected (or if the error between its actual and predicted positions is above a second threshold), a docking error may be indicated (e.g., by an indicator visible to the driver of the bus 10), and the docking process aborted. In some embodiments, when a docking error is indicated, the driver may attempt to dock the bus 10 again by repeating the above described process. Although the sensor in the charging station 100 is described as an ultrasonic sensor 110, this is not a requirement. In general, any type of sensor that is configured to detect features (components, lines, tags, etc.) on the bus 10 may be used.

FIG. 2B illustrates the bus 10 entering an area under the charging assembly 120 of the charging station 100. After the monitored distance (corrected distance (d')) is confirmed or corrected based on observed features on the bus (e.g., feature A), the control system 160 may continue to check (using ultrasonic sensor 110) for expected features (B, C, D, etc.) on the roof 18 to confirm that the monitored distance is correct, and the bus is suitably positioned for docking. In some embodiments, upon detection of feature A (which indicates that the bus 10 has entered under the charging assembly 120), the control system 160 may activate (or reset) an internal counter to keep track of distance (Y) travelled by the bus 10 under the charging assembly 120. As the bus 10 continues to move under the charging assembly 120, the control system 160 updates distance (Y) based on the distance received from the control unit 60, and monitors the position of the roof 18 under the charging assembly 120. In some embodiments, the control system 160 may correct the monitored distance (Y) based on the observed positions of the features (e.g., features B, C, D, etc.) on the roof 18. For example, based on dimensions of the bus 10, the control system 160 may expect features B and C to be positioned under the charging assembly 120 when the monitored distance (Y) is ($Y_B$) and ($Y_C$) respectively. Detection of these features confirms that the monitored distances are correct, and the docking process is proceeding as expected. Failure to detect an expected feature (or detecting a feature before it is expected) may indicate an error and cause the docking process to be aborted. In some embodiments, the docking process may be aborted only if multiple features are not detected (or detected when not expected).

When a predetermined point of the roof 18 is positioned under the charging assembly 120 (e.g., when the monitored distance is between $Y_C$ and $Y_E$, when feature C is positioned under the charging assembly 120, etc.), the control system 160 may lower (i.e., initiate the descend of) the charge head 130 from the charging assembly 120 to land on the roof 18 of the bus 10. In some embodiments, the bus 10 may be stopped (i.e., stationary) while the charge head 130 descends and lands on the roof 18. For example, when the monitored distance (Y) reaches a predetermined value between $Y_D$ and $Y_E$ (i.e., when the landing zone 32 of the charging interface 16 is positioned below the charging assembly 120), instructions may be sent by the control system 160 to stop the bus 10, and the charge head 130 may be lowered. The charge head 130 may descend and land on the landing zone 32 of the stationary bus 10. After the charge head 130 lands, the bus 10 may again move forward (with the charge head 130 sliding on the roof) until electrodes in the charge head 130 engage with electrodes 24 in the charging blade 20 (see FIG. 1). An electrical signal (e.g., a pilot signal) may indicate the engagement of these electrodes. After the electrodes engage, current flow from the charging head 130 to the bus 10 may be initiated. Stopping the bus 10 while the charge head 130 descends may prevent the charge head 130 from colliding with components on the roof 18, or landing in undesired locations (e.g., feature E) of the roof 18. However, stopping the bus 10 while the charge head 130 descends may increase the docking time, and consequently, adversely affect operational efficiency.

Therefore, to decrease the docking time (and thus increase efficiency), in some embodiments, the bus 10 may continue to move under the charging assembly 120 while the charge head 130 descends and lands on the roof 18. For example, the control system 160 may initiate the lowering of the charge head 130 when the charging assembly 130 is positioned over a selected location on the roof 18 (e.g., when the monitored distance (Y) is $Y_D$, and/or when the ultrasonic sensor 110 detects feature D). The bus 10 may continue to move under the charging assembly 120 as the charge head 130 descends and lands on the landing zone 32 (e.g., between features D and E). After the charge head 130 lands on the landing zone 32, the bus 10 may keep moving (with the charge head 130 sliding on the roof 18) until the charge head 130 slides past feature E and engages with the electrodes 24 of the charging interface 16.

As the charge head 130 slides towards feature E, the rails of the funnel-shaped alignment scoop 30 positioned on either side of the charging interface 16 may push the charge head 130 towards the center line of the charging interface 16, and into alignment with the charging blade 20 (see FIG. 1). The bus 10 is then stopped and charging begun. The selected location of the roof 18 at which the charge head 130 begins to descend may be selected based on the speed of the bus 10 and other characteristics of the bus 10 and the charging station 100 (e.g., height of the charge head 130 above the roof 18, speed at which the charge head 130 descends, etc.). In some embodiments, this selected location may be computed in situ by the control system 160 based on known characteristics of the system and the received bus speed (v). In some embodiments, the selected location may be predetermined and programmed into the control system 160.

In some embodiments where the bus 10 continues to move when the charge head 130 descends, the speed (v) of the bus 10 may have to be reduced to ensure that tall components on the roof 18 do not collide with the descending charge head 130. However, reducing the bus speed increases docking time. Therefore, in some embodiments, the control system 160 may initially lower the charge head 130 by a first amount (to a pre-deployment position) when the charging assembly 130 is positioned over a first location on the roof 18, and then further lower the charge head 130 to land on the landing zone 32 when the charging assembly 130 is positioned over a second location on the roof 18. For example, the control system 160 may initiate the lowering of the charge head 130 to the pre-deployment position when feature B is positioned under the charging assembly 130. The control system 160 may then initiate the lowering of charge head 130 (from the pre-deployment position) to land on the roof 18 when feature D is positioned under the charging assembly 130. Since, the charge head 130 only has to descend a relatively smaller amount from its pre-deployment position to land on the roof 18, the distance moved by the bus 10 during this time will be smaller. Thus, the descending charge head 130 can be expected to land in a desired region of the roof 18 (e.g., 5-15 inches past feature D) even when the speed (v) of the bus is increased.

In general, the pre-deployment position of the charge head 130 may be any vertical position (i.e., height) between its initial position in the charging assembly 120 and its final position on the roof 18 of the bus 10. The pre-deployment position may be a predetermined position, or may be calculated in situ based on structural details of the bus 10 and charging station 100. In some embodiments, the pre-deployment position may be located about 3 to 6 inches (76.2-152.4 mm) above the expected height of the tallest component on the roof 18 of the bus 10. That is, when the charge head 130 is at its pre-deployment position, there may be an air gap of about 3-6 inches (76.2-152.4 mm) between the bottom of the charge head 130 and the top of the tallest component on the roof 18. In some embodiments, the charging interface 16 may be the tallest component on the roof 18 of the bus 10. In such embodiments, the pre-deployment position of the charge head 130 may be about 3-6 inches (76.2-152.4 mm) above the charging interface 16.

In some embodiments, when the charge head 130 is its pre-deployment position, if the sensors 110 detect an unexpected object (e.g., a tree limb or another debris, etc.) on the roof 18 that may collide with the charge head 120, the charge head 130 may automatically retract (or ascend) to a position which is about 3-6 inches above the height of this newly detected object. For example, when feature B of the bus 10 is below the charging assembly 120, the charge head 130 may automatically descend to its pre-deployment position which is about 4 inches above the height of the charging interface 16. As the bus 10 moves under the lowered charge head 130, if sensors 110 detect an unexpected object between features C and D which may collide with the charge head 130, the charge head 130 may automatically retract to a new pre-deployment position which is about 4 inches above this object. This capability may serve as a collision-avoidance feature to prevent collision of the charge head 130 with objects on the roof 18 of the bus 10. The rate at which the charge head 130 ascends and descends may be pre-programmed and fixed, or may vary and depend upon the observed conditions (speed (v) of the bus 10, height of the unexpected object, etc.). For example, the rate at which the charge head 130 ascends (and descends in some cases) upon detection of an unexpected object may increase with bus speed (v) and the height of the object. Thus, in its pre-deployment position, the charge head 130 may float above the roof 18 such that a constant gap is maintained between the components (and unexpected objects) on the roof 18 and the charge head 130. The charge head 130 may then begin to descend from its pre-deployment position when feature D is positioned below the charging assembly 120 to land on the landing zone 32 between features D and E.

Figure 3A:
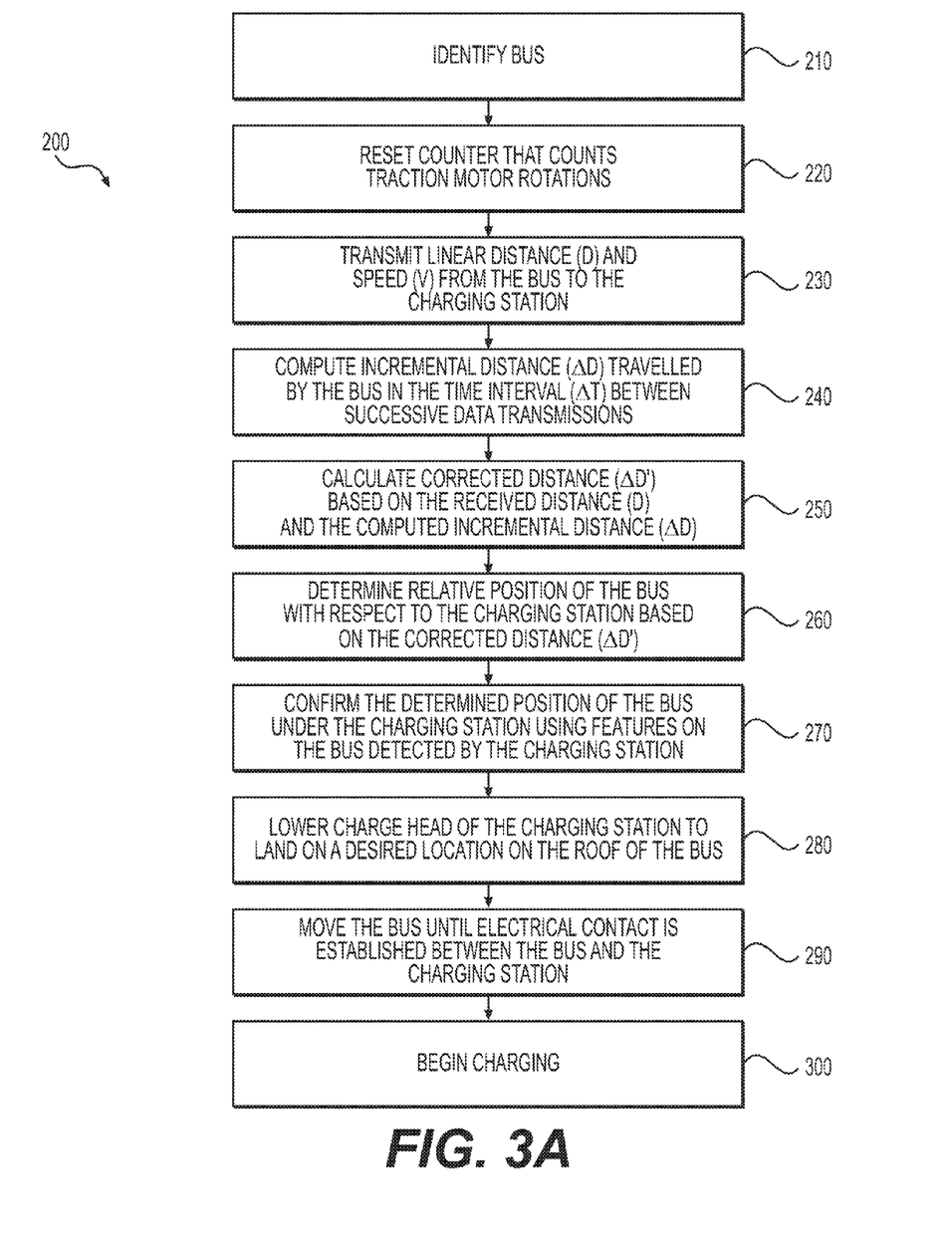
FIG. 3A is a flow chart of an exemplary docking process of the bus of FIG. 1.

FIG. 3A illustrates an exemplary method 200 of docking the bus 10 with the charging station 100. The description below refers to several components of the bus 10 and the charging station 100 identified in the previous figures. As the bus 10 approaches the charging station 100, the approaching bus is identified (step 210). In some embodiments, an RFID reader on the charging station 100 reads the bus ID number from an RFID tag 22 on the bus to identify the bus 10 and determine that it is configured to be charged at the charging station 100. The charging station 100 may then instruct the bus 10 to reset a counter that counts the number rotations of its traction motor (step 220). In some embodiments, the counter may be instructed to reset only after the charging station 100 confirms that the bus 10 desires charging at the charging station 100. After resetting the counter, the bus 10 may periodically transmit to the charging station 100, a data packet that includes, among other information, the linear distance (d) moved by the bus 10 and its speed (v) (step 230). The time interval ($\Delta t$) between successive transmissions of the data packets from the bus 10 may depend on the loop time of the controllers that are involved in acquiring and analyzing the transmitted data from sensors of the bus 10.

Upon receipt of the transmitted data packet from the bus 10, the charging station 100 may compute the incremental distance ($\Delta d$) travelled by the bus 10 in the time interval ($\Delta t$) between data transmissions (step 240). In some embodiments, this incremental distance ($\Delta d$) may be computed using the speed (v) data received from the bus 10. In some embodiments, the incremental distance ($\Delta d$) may be calculated by assuming that the speed (v) remains a constant during the time interval (Δt). In other embodiments, the incremental distance (Δd) may be computed by considering the speed variation. The charging station 100 may then calculate a corrected distance (d') based on the distance (d) data received from the bus 10 and the computed incremental distance (Δd) (step 250). The charging station 100 may then determine the relative position of the bus 10 with respect to the charging station 100 using the corrected distance (d') travelled by the bus 10 and known dimensional information of the bus 10 (step 260).

As the bus 10 drives under the charging assembly 120, sensors (e.g., ultrasonic sensors, etc.) in the charging station 100 may detect structural features on the roof 18 of the bus 10. The charging station 100 may use the known positions of the detected features to confirm the computed location of the bus 10 under the charging station 100 (step 270). In some embodiments, if an expected structural feature on the bus roof 18 is not detected by the charging station sensors, the charging station 100 may indicate a docking error and abandon the docking process. In some embodiments, after a structural feature is detected, the charging station 100 may instruct the bus 10 to reset its motor rotation counter to reduce error buildup. When the bus 10 is appropriately positioned under the charging assembly 120, the charge head 130 is lowered to land on a desired region (e.g., the landing zone 32 of the charging interface 16) of the bus roof 18 (step 280). With the charge head 130 contacting the roof 18, the bus 10 is moved further until electrical contact is established the charge head 130 and the charging interface 16 (step 290). Electrical current is then passed from the charging station 100 into the bus 10 to charge its battery system 14 (step 300).

Figure 3B:
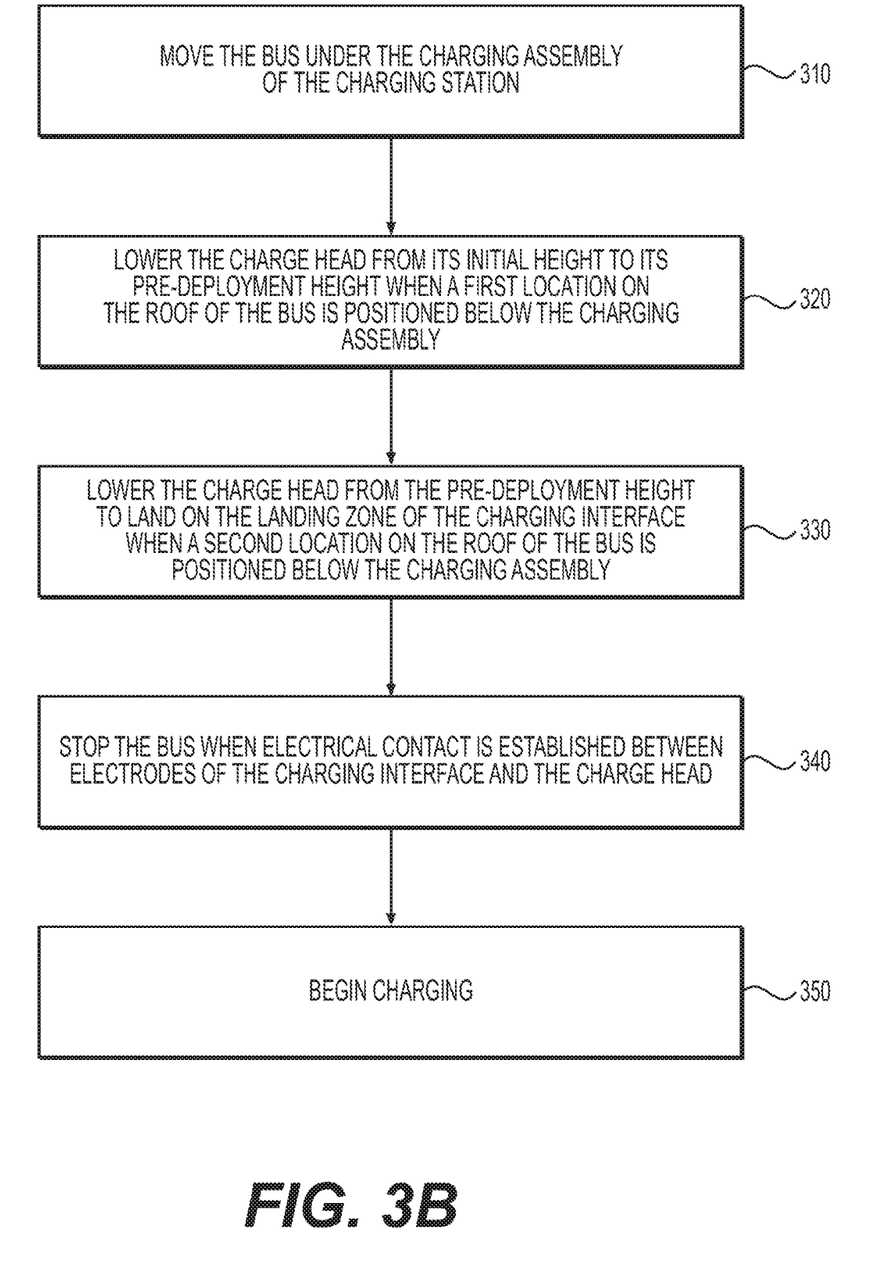
FIG. 3B is a flow chart of another exemplary docking process of the bus of FIG. 1.

The bus 10 may be stationary or may be moving when the charge head 130 is lowered to land on the bus roof 18 (step 280). In some embodiments where the bus 10 continues to move as the charge head 130 descends, the charge head 130 may be lowered in multiple stages to land on a desired region of the roof 18. FIG. 3B illustrates an exemplary method of lowering the charge head 130 in multiple stages as the bus continues to move under the charge head 130. As the bus 10 moves under the charging assembly 120 (step 310) (after step 270 of FIG. 3A), the charge head 130 is lowered from its initial position to a pre-deployment position when a first location (e.g., feature A, B, etc. of FIG. 2B) on the roof 18 is below the charging assembly 120 (step 320). The charge head 130 may then be lowered from the pre-deployment position to land on the desired region (e.g., landing zone 32) of the roof 18, when a second location (e.g., feature C, D, etc. of FIG. 2B) on the roof 18 is positioned below the charging assembly 120 (step 330). The bus 10 may then continue to move, with the charge head 130 sliding on the roof 18, until electrical contact between the charge head 130 and the charging interface 16 is established (step 340). Charging is then started (step 350).

By accounting for the time interval (Δt) between when data is collected at the bus and when the data is received at the charging station 100, the position of the bus 10 relative to the charging station 100 during docking can be accurately tracked. This accurate tracking may increase the operating efficiency of the bus by reducing aborted docking events and increasing successful docking events. Accounting for the time interval (Δt) may also allow the bus speed (v) to be increased during the docking process. Increasing the bus speed (v) during docking may decrease docking time. Lowering the charge head on the bus roof in multiple stages may allow the bus to continue to move at the increased speed (v) while the charge head is descending and further decrease docking time. Decreasing the docking time reduces the time spend by the bus in docking and thus further increase operating efficiency.

While the current disclosure describes a docking process of an electric bus with a charging station, it should be understood that the disclosure is not limited thereto. Rather, the principles described herein may be employed to control the docking process of any electrical vehicle. For example, the disclosed approach may be used to dock an inductively charged electric car with a charging pad (i.e., accurately position the car with charging coils in the car and the pad aligned). Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A method of docking an electric vehicle with a charging station, comprising:
    collecting data at the electric vehicle;
    periodically transmitting information, derived at least partly from the collected data, from the electric vehicle to the charging station as the electric vehicle travels from a first location towards the charging station, the transmitted information including:
        a distance (d) travelled by the electric vehicle from the first location towards the charging station; and
        a speed (v) of the electric vehicle;
    receiving the transmitted information at the charging station;
    computing an incremental distance (Δd) travelled by the electric vehicle in a time interval (Δt) between when the data is collected at the electric vehicle and when the transmitted information is received at the charging station, wherein computing the incremental distance (Δd) includes determining a product of the time interval (Δt) and the received speed (v);
    calculating a corrected distance (d') based on the computed incremental distance (Δd) and the received distance (d), wherein calculating the corrected distance (d') includes calculating the corrected distance as the sum of the received distance (d) and the computed incremental distance (Δd);
    determining a relative position of the electric vehicle with respect to the charging station based on at least the calculated corrected distance (d'); and
    automatically connecting a charge head of the charging station with a charging interface of the electric vehicle based on the determined relative position.

2. The method of claim 1, further including, using the charging station to identify the electric vehicle at the first location as the electric vehicle approaches the charging station, wherein periodically transmitting the information includes initiating the periodic transmission of the information after the identification.

3. The method of claim 2, wherein identifying the electric vehicle includes reading an identification number of the approaching electric vehicle using a sensor of the charging station.

4. The method of claim 1, wherein computing the incremental distance ($\Delta d$) includes computing the incremental distance ($\Delta d$) as a product of the time interval ($\Delta t$) and the received speed (v).

5. The method of claim 1, wherein automatically connecting the charge head includes lowering the charge head to rest on a roof of the electric vehicle when the calculated corrected distance (d') reaches a predetermined value.

6. The method of claim 5, wherein automatically connecting the charge head includes lowering the charge head from an initial position to an intermediate pre-deployment position when the calculated corrected distance (d') reaches a first value, and further lowering the charge head from the intermediate pre-deployment position to rest on the roof when the calculated corrected distance (d') reaches the predetermined value.

7. The method of claim 5, further including moving the electric vehicle with the charge head resting on the roof until an electrical signal indicative of electrical contact between the charge head and the electric vehicle is received.

8. The method of claim 7, further including charging the electric vehicle using the charge head after receiving the electrical signal.

9. The method of claim 1, further including checking an accuracy of the determined relative position based on structural features of the electric vehicle detected by the charging station.

10. A method of docking an electric vehicle at a charging station, comprising:
    identifying the electric vehicle at a first location as the electric vehicle approaches the charging station, wherein the identifying includes determining whether the electrical vehicle is supposed to be charged at the charging station;
    periodically transmitting data packets from the electric vehicle to the charging station, wherein the periodically transmitting includes transmitting successive data packets at a time interval ($\Delta t$), the transmitted data packets including:
        a distance (d) travelled by the electric vehicle from the first location towards the charging station; and
        a speed (v) of the electric vehicle;
    computing an incremental distance ($\Delta d$) travelled by the electric vehicle in the time interval ($\Delta t$);
    calculating a corrected distance (d') as a sum of the computed incremental distance ($\Delta d$) and the received distance (d); and
    automatically moving a charge head of the charging station to contact a charging interface of the electric vehicle when the calculated corrected distance (d') reaches a predetermined value, wherein automatically moving the charge head includes lowering the charge head from an initial position to an intermediate pre-deployment position when the calculated corrected distance (d') reaches a first value, and further lowering the charge head from the intermediate pre-deployment position to rest on a roof of the electric vehicle when the calculated corrected distance (d') reaches the predetermined value.

11. The method of claim 10, wherein computing the incremental distance ($\Delta d$) includes determining a product of the time interval ($\Delta t$) and the received speed (v).

12. The method of claim 10, further including moving the electric vehicle with the charge head sliding on the roof until an electrical signal indicative of electrical contact between the charge head and the electric vehicle is received.

13. The method of claim 12, further including initiating electric current flow from the charge head to the electric vehicle after receiving the electrical signal.

14. A method of docking an electric vehicle at a charging station, the charging station including a charge head configured to make electrical contact with a charging interface positioned on a roof of the vehicle, comprising:
    identifying the electric vehicle at a first location as the electric vehicle approaches the charging station;
    periodically transmitting data packets from the electric vehicle to the charging station, wherein the periodically transmitting includes transmitting successive data packets at a time interval ($\Delta t$), the transmitted data packets including:
        a distance (d) travelled by the electric vehicle from the first location towards the charging station; and
        a speed (v) of the electric vehicle;
    computing an incremental distance ($\Delta d$) travelled by the electric vehicle in the time interval ($\Delta t$), wherein computing the incremental distance ($\Delta d$) includes computing the incremental distance ($\Delta d$) based on a product of the received speed (v) and the time interval ($\Delta t$);
    calculating a corrected distance (d') based on the computed incremental distance ($\Delta d$), wherein calculating the corrected distance (d') includes calculating the corrected distance (d') as a sum of the computed incremental distance ($\Delta d$) and the received distance (d);
    detecting structural features on the electric vehicle using one or more sensors located in the charging station;
    checking an accuracy of the calculated corrected distance (d') based on the detected structural features; and
    if the checking indicates that the calculated correct distance (d') is accurate, automatically lowering the charge head to contact the charging interface of the electric vehicle when the calculated corrected distance (d') reaches a predetermined value.

15. The method of claim 14, further including:
    if the checking indicates that the calculated correct distance (d') is not accurate, indicating a docking error.

16. The method of claim 14, wherein automatically lowering the charge head includes lowering the charge head from an initial position to an intermediate pre-deployment position when the calculated corrected distance (d') reaches a first value, and further lowering the charge head from the intermediate pre-deployment position to rest on the charging interface when the calculated corrected distance (d') reaches the predetermined value.

17. The method of claim 16, further including:
    moving the electric vehicle with the charge head sliding on the charging interface until an electrical signal indicative of electrical contact between the charge head and the electric vehicle is received; and
    initiating electric current flow from the charge head to the electric vehicle after receiving the electrical signal.

18. The method of claim 1, wherein computing the incremental distance includes computing the incremental distance accounting for a change in speed (v) of the electric vehicle in the time interval ($\Delta t$).

19. The method of claim 10, wherein computing the incremental distance includes computing the incremental distance accounting for a change in speed (v) of the electric vehicle in the time interval ($\Delta t$).

20. The method of claim 14, wherein computing the incremental distance includes computing the incremental distance accounting for a change in speed (v) of the electric vehicle in the time interval ($\Delta t$).

* * * * *